(12) United States Patent
Cumberland et al.

(10) Patent No.: US 8,465,825 B1
(45) Date of Patent: Jun. 18, 2013

(54) MICRO-TRUSS BASED COMPOSITE FRICTION-AND-WEAR APPARATUS AND METHODS OF MANUFACTURING THE SAME

(75) Inventors: Robert W. Cumberland, Malibu, CA (US); William B. Carter, Santa Monica, CA (US); Alan J. Jacobsen, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 691 days.

(21) Appl. No.: 12/577,991

(22) Filed: Oct. 13, 2009

Related U.S. Application Data

(60) Provisional application No. 61/217,281, filed on May 29, 2009.

(51) Int. Cl.
*B32B 3/12* (2006.01)
*B32B 5/14* (2006.01)
*F16D 65/12* (2006.01)
*F16D 69/00* (2006.01)

(52) U.S. Cl.
USPC ........ 428/117; 428/116; 428/308.4; 428/172; 428/158; 428/159; 188/218 XL; 188/251 R; 188/18 A; 165/DIG. 533

(58) Field of Classification Search
USPC .............. 428/116, 117, 158, 159, 172, 308.4; 192/53.1, 107 M, 107 R; 165/104.19, 133
See application file for complete search history.

(56) References Cited

U.S. PATENT DOCUMENTS 3,977,294 A 8/1976 Jahn
4,030,427 A 6/1977 Goldstein
4,219,597 A 8/1980 Maistre
4,309,487 A 1/1982 Holmes
4,400,421 A 8/1983 Stover
(Continued)

FOREIGN PATENT DOCUMENTS
WO WO 2010010989 A1 * 1/2010

OTHER PUBLICATIONS

Jacobsen, Alan J. et al., "Micro-scale Truss Structures formed from Self-Propagating Photopolymer Waveguides", Advanced Materials, Nov. 2007, Wiley-VCH GmbH & Co.*

(Continued)

*Primary Examiner* — Michele L Jacobson
*Assistant Examiner* — Lee Sanderson
(74) *Attorney, Agent, or Firm* — Christie, Parker & Hale, LLP

(57) ABSTRACT

A micro-truss based composite friction-and-wear apparatus with a three-dimensional ordered microstructure and a method creating the same. In one embodiment, the apparatus includes a filler material and a three-dimensional ordered microstructure. The three-dimensional ordered microstructure includes a plurality of first truss elements defined by a plurality of first self-propagating polymer waveguides and extending along a first direction; a plurality of second truss elements defined by a plurality of second self-propagating polymer waveguides and extending along a second direction; and a plurality of third truss elements defined by a plurality of third self-propagating polymer waveguides and extending along a third direction. The first, second, and third truss elements interpenetrate each other at a plurality of nodes to form a continuous material, the first, second, and third truss elements define an open space, the filler material occupies at least a portion of the open space, and the three-dimensional ordered microstructure is self-supporting.

20 Claims, 16 Drawing Sheets

U.S. PATENT DOCUMENTS

| | | | |
|---|---|---|---|
| 4,568,595 A | 2/1986 | Morris | |
| 4,604,249 A | 8/1986 | Luhleich et al. | |
| 4,876,941 A | 10/1989 | Barnes et al. | |
| 5,070,673 A * | 12/1991 | Weisse | 52/793.1 |
| 5,114,772 A | 5/1992 | Vives et al. | |
| 5,185,297 A * | 2/1993 | Park et al. | 501/80 |
| 5,221,807 A | 6/1993 | Vives | |
| 5,288,538 A * | 2/1994 | Spears | 428/116 |
| 5,306,557 A | 4/1994 | Madison | |
| 5,361,678 A | 11/1994 | Roopchand et al. | |
| 5,372,978 A | 12/1994 | Ezis | |
| 5,401,694 A | 3/1995 | Gesing et al. | |
| 5,654,518 A | 8/1997 | Dobbs | |
| 5,763,813 A | 6/1998 | Cohen et al. | |
| 5,767,022 A | 6/1998 | Clere et al. | |
| 5,861,203 A * | 1/1999 | Yuan et al. | 428/117 |
| 6,086,814 A | 7/2000 | Krenkel et al. | |
| 6,112,635 A | 9/2000 | Cohen | |
| 6,261,981 B1 | 7/2001 | Dietrich et al. | |
| 6,289,781 B1 | 9/2001 | Cohen | |
| 6,480,734 B1 | 11/2002 | Zhang et al. | |
| 6,575,075 B2 | 6/2003 | Cohen | |
| 6,592,787 B2 | 7/2003 | Pickrell et al. | |
| 6,609,452 B1 | 8/2003 | McCormick et al. | |
| 6,764,628 B2 | 7/2004 | Lobovsky et al. | |
| 6,855,428 B2 | 2/2005 | Lau et al. | |
| 6,887,809 B1 | 5/2005 | Adler | |
| 6,941,888 B2 | 9/2005 | Barsoum | |
| 6,955,112 B1 | 10/2005 | Adams et al. | |
| 7,069,836 B1 | 7/2006 | Palicka et al. | |
| 7,117,780 B2 | 10/2006 | Cohen | |
| 7,382,959 B1 | 6/2008 | Jacobsen | |
| 7,401,643 B2 * | 7/2008 | Queheillalt et al. | 165/104.21 |
| 7,424,967 B2 * | 9/2008 | Ervin et al. | 228/193 |
| 7,582,394 B2 | 9/2009 | Noda et al. | |
| 7,653,276 B1 * | 1/2010 | Gross et al. | 385/46 |
| 7,687,132 B1 * | 3/2010 | Gross et al. | 428/116 |
| 7,691,284 B2 * | 4/2010 | Cumberland et al. | 252/62.51 R |
| 7,938,989 B1 * | 5/2011 | Gross et al. | 264/1.27 |
| 8,155,496 B1 * | 4/2012 | Cumberland et al. | 385/147 |
| 2002/0012768 A1 | 1/2002 | Cohen | |
| 2003/0057040 A1 | 3/2003 | Bauer et al. | |
| 2004/0154252 A1 * | 8/2004 | Sypeck et al. | 52/506.01 |
| 2004/0200417 A1 | 10/2004 | Hanawa et al. | |
| 2004/0241412 A1 * | 12/2004 | Huener et al. | 428/292.1 |
| 2005/0072294 A1 | 4/2005 | Cohen | |
| 2005/0202206 A1 * | 9/2005 | Wadley et al. | 428/116 |
| 2006/0062987 A1 | 3/2006 | Niewohner et al. | |
| 2006/0105184 A1 | 5/2006 | Palicka et al. | |
| 2006/0137517 A1 | 6/2006 | Palicka et al. | |
| 2006/0186565 A1 | 8/2006 | Huener et al. | |
| 2006/0225180 A1 | 10/2006 | Ben-Simhon | |
| 2006/0234577 A1 | 10/2006 | Wagner et al. | |
| 2006/0244165 A1 * | 11/2006 | Huang | 264/29.5 |
| 2007/0034462 A1 * | 2/2007 | Themelin et al. | 188/264 R |
| 2009/0035510 A1 * | 2/2009 | Chakrabarti | 428/116 |
| 2010/0159294 A1 | 6/2010 | Fly et al. | |
| 2010/0236759 A1 * | 9/2010 | Wadley et al. | 165/104.19 |
| 2010/0323181 A1 * | 12/2010 | Nutt et al. | 428/221 |
| 2011/0042512 A1 * | 2/2011 | Wadley et al. | 244/114 B |

OTHER PUBLICATIONS

Jacobsen, Alan J., et al "Micro-scale truss structures with three-fold and six-fold symmetry formed from self-propagating polymer waveguides" Acta Materialia, 2008, 56, 2540-2548.*

Jacobsen, Alan J. et al, "Compression behavior of micro-scale truss structures formed from self-propagating polymer waveguides" Acta Materialia, 2007, 56, 6724-6733.*

Jacobsen, Alan J. et al., "Micro-scale Truss Structures formed from Self-Propagating Photopolymer Waveguides", Advanced Materials, 2007, 19, 3892-3896.*

Ashby, M.F. "The properties of foams and lattices", Phil. Trans. R. Soc. A, 2006, 364, 15-30.*

U.S. Patent No. 8,155,496, Issued Apr. 10, 2012, Entitled "Composite Truss Armor," Application, Office Actions, Responses and Notices of Allowance (22 pages).

\* cited by examiner

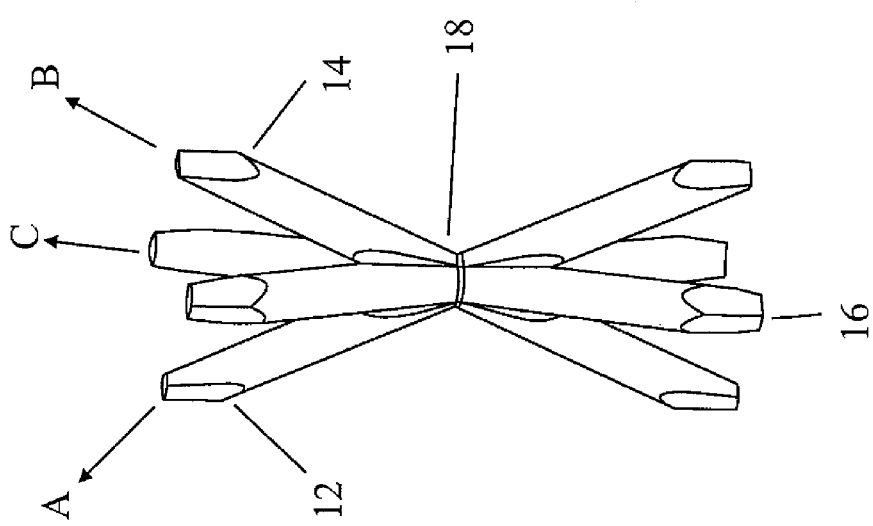
FIG. 1
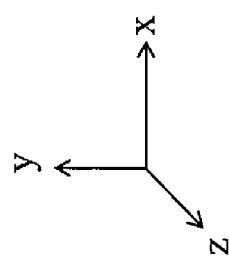

MICRO-TRUSS BASED COMPOSITE FRICTION-AND-WEAR APPARATUS AND METHODS OF MANUFACTURING THE SAME

CROSS-REFERENCE TO RELATED APPLICATION(S)

This application claims priority to and the benefit of U.S. Provisional Application No. 61/217,281, filed on May 29, 2009, entitled "Micro-Truss Based Composite Friction-And-Wear Apparatus And Methods Of Manufacturing The Same." The entire contents of the above-referenced application are incorporated herein by reference.

FIELD OF THE INVENTION

The present invention relates to micro-truss based composite friction-and-wear apparatus and methods of manufacturing the same, and more particularly, to micro-truss based composite clutches, brake rotors, and/or pads and methods of manufacturing the same.

BACKGROUND OF THE INVENTION

In high end automotive applications, the performance of an automobile may have to be compromised to ensure that brake rotors do not fail under use, where they are subjected to extraordinary levels of wear, compressive force, and high temperatures. The rotors of the automobile need to be strong enough to withstand the torque and compressive forces generated during a major stopping event, placing a lower limit on how thin and therefore how light a rotor made of any given material can be. Constructing a rotor based on a ceramic truss structure will allow for a lighter part which still retains enough strength to survive the forces generated in high-load braking events. Decreasing the mass of brake rotors can greatly improve automotive performance in two ways: 1) lightening the rotors decreases the unsprung mass in an automobile's suspension system, greatly increasing handling response, especially over rough terrain; and 2) lightening the rotors decreases the mass of a rotating part, which will greatly improve acceleration as rotating parts require both rotational and translational energy to move.

Also, saving weight is of a particular priority for an aircraft. For example, by decreasing the weight of a disc braking system, any aircraft which uses such a system would see a direct benefit. As such, there is need for a light weight and high performance friction-and-wear apparatus that can, for example, be applied to aircrafts and/or high end automobiles (i.e. racing) where carbon/carbon and carbon/ceramic composite brakes are frequently used.

U.S. Pat. No. 6,764,628, which is incorporated by reference herein in its entirety, describes a process of creating a carbon/carbon composite wherein the carbon fibers typically used are replaced with carbon nanotubes. Although the structure described in U.S. Pat. No. 6,764,628 has applications for brake construction, it does not possess long range order and/or structure of a micro-scaffold.

U.S. Pat. No. 5,767,022, which is incorporated by reference herein in its entirety, describes the creation of a structure having long glass fibers. Again, although one of the applications for the structure described in U.S. Pat. No. 5,767,022 is listed as high friction brake pads, this structure does not have any organized structure.

U.S. Pat. No. 6,855,428, which is incorporated by reference herein in its entirety, describes the fabrication and use of a boron carbide ceramic composite for use in aircraft braking systems. Again, there is no mention of a structured framework in U.S. Pat. No. 6,855,428.

U.S. Pat. No. 6,261,981, which is incorporated by reference herein in its entirety, describes the fabrication of structure having a fiber reinforced ceramic composite specifically for use in high performance braking systems. Once again, there is no mention of creating the composite with an organized framework substructure in U.S. Pat. No. 6,261,981.

U.S. Pat. No. 6,086,814, which is incorporated by reference herein in its entirety, describes a method for manufacturing a SiC based friction element by infiltrating silicon into a porous carbon shaped structure and pyrolizing the infiltrated structure to create a SiC part. The applicability of the finished part to brakes and clutches is mentioned in U.S. Pat. No. 6,086,814, but it does not provide for creation of a part with an organized framework-like structure.

U.S. Patent Publication Nos. 20060062987, 20060244165, 20060186565, 20030057040, and 20040241412, which are incorporated by reference herein in their entirety, all describe variations on manufacturing ceramic/metal/carbon composites for use in braking systems. However, as with the patent references described above, none of these patent publications provide for the possibility of arranging any of the ceramic, metal, or carbon components into an organized framework.

In view of the foregoing, although current high performance braking systems use a carbon/carbon, ceramic, or a carbon/ceramic composite for its rotors and/or pads, these composites do not provide for or propose making a braking system that utilizes an organized framework substructure as a component in a composite. That is, these current composites are formed from a random network of particles or fibers dispersed throughout some matrix, and none of them utilize constructing parts wherein one of the components of the composite exists as an ordered or organized framework. The random orientation of the composites used in current braking systems is their weakest point; replacing the same systems with a composite which exhibits long range and short range order can increase thermal conductivity and strength to weight ratio, increasing overall performance. As such, there is a need for a micro-truss based composite friction-and-wear apparatus with a three-dimensional ordered microstructure that can be both light in weight and high in performance and a method creating the same.

SUMMARY OF THE INVENTION

Aspects of embodiments of the present invention are directed towards a micro-truss based composite friction-and-wear apparatus with a three-dimensional ordered microstructure and a method creating the same. In one embodiment, the micro-truss based composite friction-and-wear apparatus is a micro-truss based composite clutch, brake rotor, and/or pad.

An embodiment of the present invention provides a micro-truss based composite friction-and-wear apparatus. The micro-truss based composite friction-and-wear apparatus includes a filler material and a three-dimensional ordered microstructure. The three-dimensional ordered microstructure includes a plurality of first truss elements defined by a plurality of first self-propagating polymer waveguides and extending along a first direction; a plurality of second truss elements defined by a plurality of second self-propagating polymer waveguides and extending along a second direction; and a plurality of third truss elements defined by a plurality of third self-propagating polymer waveguides and extending along a third direction. The first, second, and third ordered truss elements are coupled at a plurality of nodes unperturbed by changes in index of refraction caused by photopolymerization of the first, second and third self-propagating polymer waveguides and defined by waveguide intersections of the first, second and third self-propagating polymer waveguides. The first, second, and third truss elements interpenetrate each other at the plurality of nodes to form a continuous material, the first, second, and third truss elements define an open space, the filler material occupies at least a portion of the open space, and the three-dimensional ordered microstructure is self-supporting.

In one embodiment, the filler material is a carbon filler material.

In one embodiment, the filler material is a metallic filler material.

In one embodiment, the filler material includes a carbon filler material and a metallic filler material.

In one embodiment, the three-dimensional ordered microstructure is a ceramic three-dimensional microstructure converted from an open-cellular polymer micro-truss structure (three-dimensional polymer microstructure).

In one embodiment, the three-dimensional ordered microstructure is a carbon three-dimensional microstructure converted from an open-cellular polymer micro-truss structure (three-dimensional polymer microstructure).

In one embodiment, the three-dimensional ordered microstructure includes a ceramic material and a carbon material.

In one embodiment, the micro-truss based composite friction-and-wear apparatus further includes a casing for capping a surface of the three-dimensional ordered microstructure with the filler material. The casing may include a material selected from the group consisting of a ceramic based casing material, a metallic based casing material, a carbon based casing material, and combinations thereof.

In one embodiment, the three-dimensional ordered microstructure is configured to have a shape of a clutch, a brake rotor, or a brake pad.

In one embodiment, the three-dimensional ordered microstructure is a heat pipe for transferring heat and a support for supporting the filler material.

In one embodiment, the micro-truss based composite friction-and-wear apparatus further includes a porous wicking medium coated onto a surface of at least one truss element of the first truss elements, the second truss elements, or the third truss elements.

In one embodiment, at least one truss element of the first truss elements, the second truss elements, or the third truss elements has a plurality of fluid-wicking grooves.

In one embodiment, an array of truss elements of the first truss elements, the second truss elements, or the third truss elements are configured with each other to allow for fluid wicking through the array.

In one embodiment, at least another portion of the open space defined by the first, second, and third truss elements is configured to out gas hot air in a direction parallel or perpendicular to a rotational axis of the apparatus.

According to another embodiment of the present invention, a method of forming a micro-truss based composite friction-and-wear apparatus is provided. The method includes: securing a volume of a photo-monomer; securing a mask between at least one collimated light source and the volume of the photo-monomer, the mask having a plurality of apertures; directing a collimated light beam from the at least one collimated light source to the mask for a period of exposure time such that a portion of the collimated light beam passes through the mask and is guided by the plurality of apertures into the photo-monomer to form a plurality of waveguides through a portion of the volume of the photo-monomer; removing any uncured photo-monomer to leave behind an open-cellular polymer micro-truss structure having a plurality of truss elements defined by the plurality of waveguides; forming a three-dimensional ordered microstructure defined by the open-cellular polymer micro-truss structure; and placing a filler material at an open space of the three-dimensional ordered microstructure.

In one embodiment, the placing of the filler material includes placing at least one of a carbon filler material or a metallic filler material at the open space of the three-dimensional order microstructure.

In one embodiment, the forming of the three-dimensional ordered microstructure includes converting the open-cellular polymer micro-truss structure (three-dimensional polymer microstructure) to a ceramic three-dimensional microstructure.

In one embodiment, the forming of the three-dimensional ordered microstructure includes converting the open-cellular polymer micro-truss structure (three-dimensional polymer microstructure) to a carbon three-dimensional microstructure.

In one embodiment, the method further includes: capping a casing on a surface of the three-dimensional ordered microstructure with the filler material, wherein the casing comprises a material selected from the group consisting of a ceramic based casing material, a metallic based casing material, a carbon based casing material, and combinations thereof.

In one embodiment, the forming of the three-dimensional ordered microstructure includes forming the three-dimensional ordered microstructure into a shape of a clutch, a brake rotor, or a brake pad.

BRIEF DESCRIPTION OF THE DRAWINGS

The accompanying drawings, together with the specification, illustrate exemplary embodiments of the present invention, and, together with the description, serve to explain the principles of the present invention.

FIG. 1 is a perspective schematic view of a portion of a structure according to an embodiment of the present invention.

DETAILED DESCRIPTION

Figure 2:
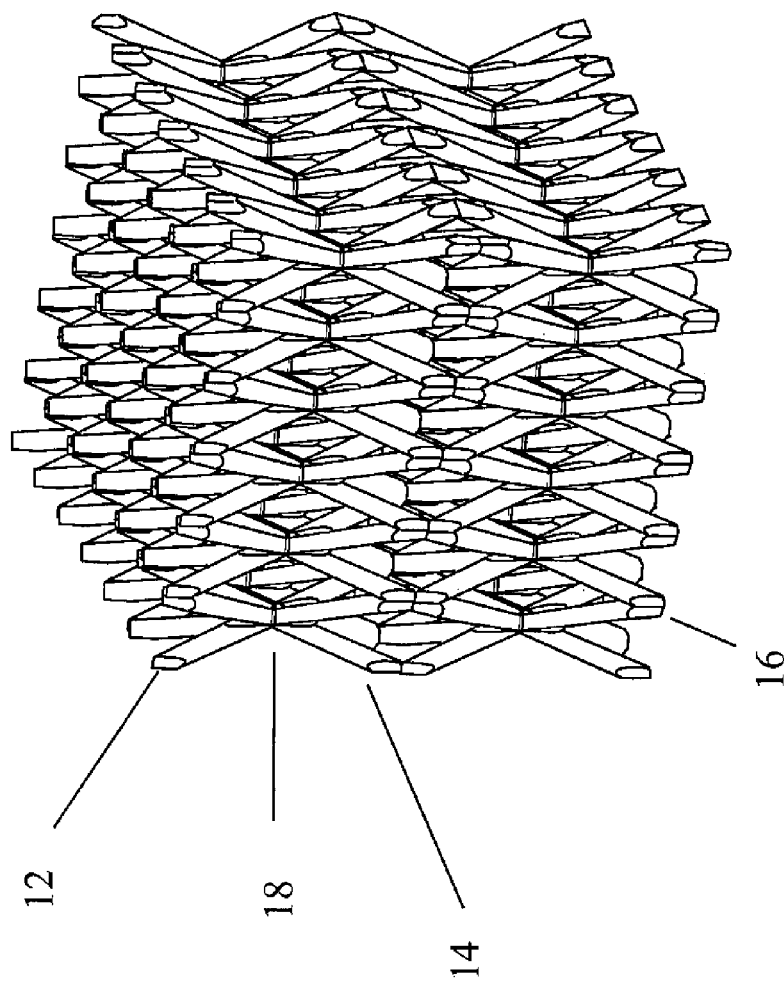
FIG. 2 is a perspective schematic view of a structure according to an embodiment of the present invention.

In the following detailed description, only certain exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, and not restrictive.

In the context of embodiments of the present invention, a three-dimensional ordered microstructure is referred to as an ordered three-dimensional structure at the micrometer scale. In one embodiment of the present invention, a micro-truss based composite friction-and-wear apparatus with a three-dimensional ordered microstructure is provided. Here, the micro-truss based composite friction-and-wear apparatus may be a micro-truss based composite clutch, brake rotor, and/or pad.

An embodiment of the present invention provides for a type of composite material/structure, which could be used in the construction of high performance friction/wear surfaces that may be subject to high performance-limiting temperatures, such as automotive and aerospace brake rotors and pads, clutch discs, bearing shafts and the like. The structure is based on an open celled micro-truss like framework (or a three-dimensional ordered microstructure), wherein the framework is composed of a ceramic or carbon material and acts as the underlying scaffold for the actual brake component. The open space throughout the ceramic truss structure (or the ceramic three-dimensional ordered microstructure) can be partially or completely filled with carbon or metallic filler material, creating a ceramic/metal or ceramic/carbon composite. For higher performance applications, the truss structure according to one embodiment of the present invention can be formed to be a structural support and a heat pipe. The exterior surface of the part can also be capped with a ceramic, metallic, or carbon based casing.

In one embodiment of the present invention, the composite material/structure is a ceramic and/or carbon composite brake component that can be utilized in the aerospace and high end automotive industry and has a three-dimensional ordered microstructure (or a microstructured, repeating lattice-like framework) throughout the component.

Also, in high performance situations, where brakes are used repeatedly in a frequent succession, heat dissipation can become a major problem. This problem can be partially solved by increasing the mass of the rotor, which allows it to absorb more energy before exceeding its maximum operating temperature. Between stopping events, external ducting may be utilized to direct air across the spinning rotor, decreasing its temperature to the point where it can survive the next stopping event. As such, according to one embodiment of the present invention, by building a rotor based on a ceramic or metallic truss scaffold and/or a ceramic or metallic three-dimensional ordered microstructure (especially in an open framework design), the rate of heat exchange between the surrounding air and the rotor can be greatly increased as a result of both the high surface area of the truss and the relatively high thermal conductivity of the ceramic. Furthermore, in one embodiment of the present invention, where the framework is not completely filled, the hot air can out gas during braking in a direction parallel to the rotational axis of the rotor. For even higher performance, heat pipe (or heat pipe like structures) can be included in one embodiment of the present invention. The heat pipe is formed from the truss scaffold to operate at high accelerations (due to centrifugal forces) and extract even more heat from the rotor or wear surface. By increasing the rate of heat exchange between the rotor and the surrounding air, the necessary mass of the rotor can be decreased, and the amount of air ducting can be reduced. The advantages of decreasing the size and weight of the rotor have been discussed above; decreasing the amount of air ducting results in an improvement in aerodynamic efficiency, decreasing drag on the automobile and improving mileage, acceleration, and top speed.

Referring to FIGS. 1 and 2, a three-dimensional ordered open-cellular microstructure 10 according to an embodiment of the present invention is a self-supporting structure. In one embodiment of the present invention, this three-dimensional ordered open-cellular microstructure 10 can be utilized as a three-dimensional ordered microstructure to define (or derive) the final shape and dimensions of a three-dimensional composite material. The microstructure 10 includes first truss elements 12, second truss elements 14, and third truss elements 16. The first truss elements 12 are defined by first self-propagating polymer waveguides and extend along a first direction A. The second truss elements 14 are defined by second self-propagating polymer waveguides and extend along a second direction B. The third truss elements 16 are defined by third self-propagating polymer waveguides and extend along a third direction C. With reference to FIGS. 1 and 2, the truss elements 12, 14, 16 interpenetrate each other at nodes 18 to form a continuous material with a three-dimensional microstructure order. Also, in one embodiment, these nodes are unperturbed by changes in index of refraction caused by photopolymerization due to their formation as described in more detail below with respect to FIG. 5.

In one embodiment, the truss elements 12, 14, 16 include a photo-polymer material. In one embodiment, the truss elements 12, 14, 16 are polymer optical waveguide truss elements.

In one embodiment, the continuous material is continuously formed such that it lacks any interior boundaries, e.g., boundaries within the interpenetrating portions of truss elements 12, 14, 16. In another embodiment, each node 18 of the microstructure 10 is formed of the continuous material.

According to one embodiment of the present invention, the microstructure 10 is formed by using a fixed light input (collimated UV light) to cure (polymerize) polymer optical waveguides, which can self-propagate in a 3D pattern. As such, the propagated polymer optical waveguides form the microstructure 10.

As disclosed in Monro et al. "Topical Review Catching Light In Its Own Trap," Journal Of Modern Optics, 2001, Vol. 48, No. 2, 191-238, which is incorporated by reference herein in its entirety, some liquid polymers, referred to as photopolymers, undergo a refractive index change during the polymerization process. The refractive index change can lead to a formation of polymer optical waveguides. If a monomer that is photo-sensitive is exposed to light (typically UV) under the right conditions, the initial area of polymerization, such as a small circular area, will "trap" the light and guide it to the tip of the polymerized region, further advancing that polymerized region. This process will continue, leading to the formation of a waveguide structure with approximately the same cross-sectional dimensions along its entire length. Here, the length of the truss elements is limited by the intensity of the light and the nature and/or material characteristics of the monomer.

According to one embodiment of the present invention, a mask with a two-dimensional pattern of apertures (see FIG. 3) is used to create a three-dimensional polymer microstructure (or an open-cellular polymer micro-truss structure).

Figure 3:
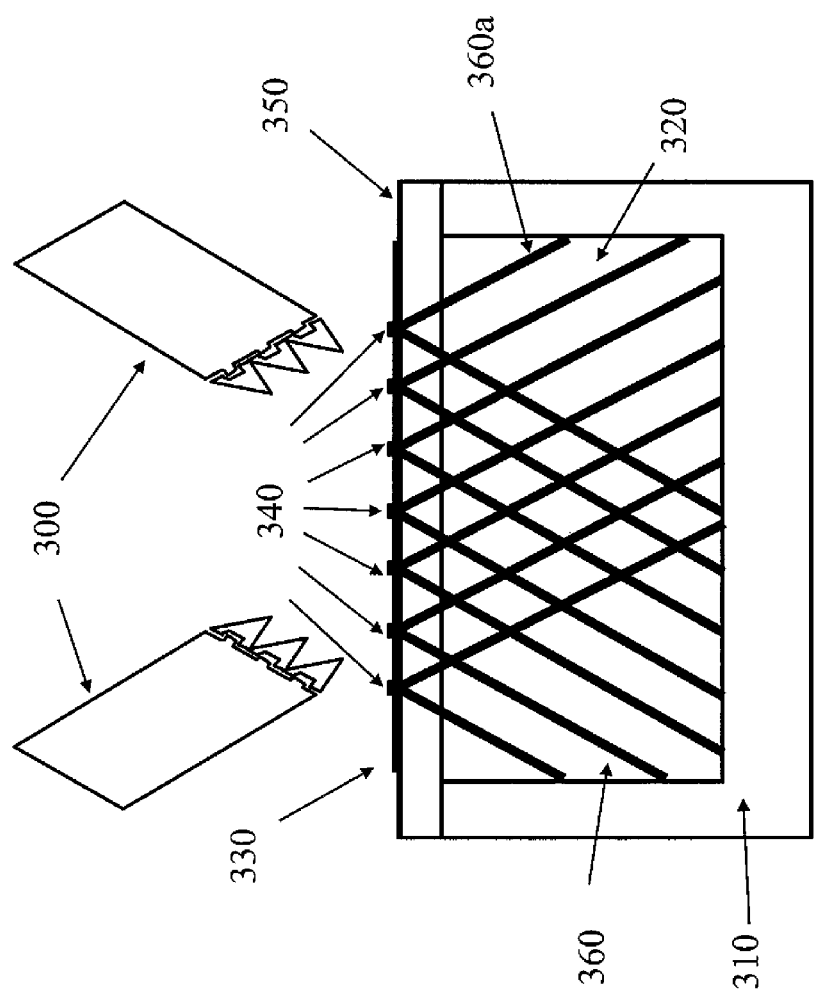
FIG. 3 is a schematic diagram of a system for forming a structure of an embodiment of the present invention from multiple waveguides created using a single collimated beam or multiple collimated beams through multiple apertures.
Figure 4B:
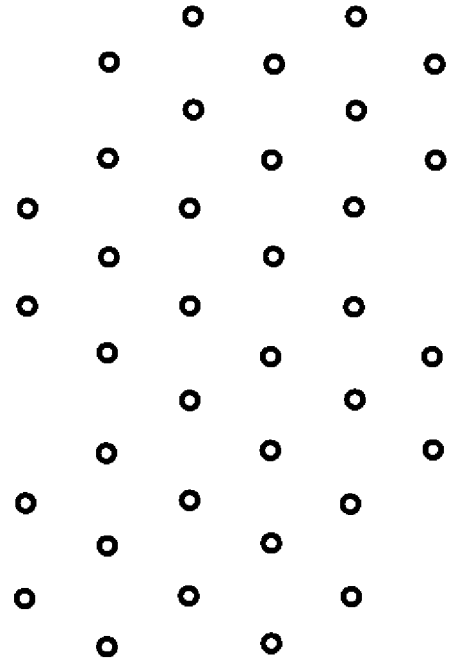
FIG. 4b illustrates an example of a hexagonal mask pattern (or a hexagonal mask aperture pattern) according to embodiments of the present invention.
Figure 4A:
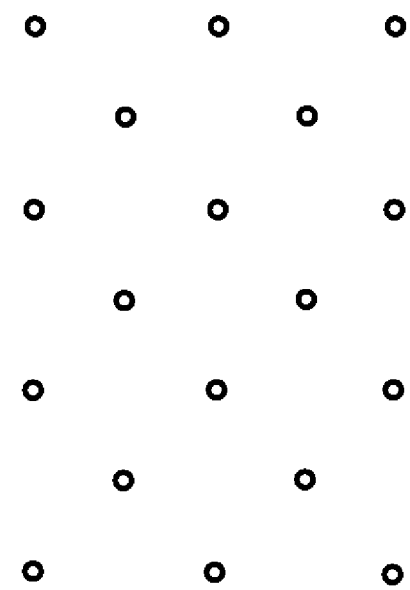
FIG. 4a illustrates an example of a square mask pattern (or a square mask aperture pattern) according to embodiments of the present invention.

With reference to FIG. 3, a system for forming a three-dimensional polymer microstructure according to an embodiment of the present invention includes one or more collimated light sources 300, a reservoir (mold) 310 having a volume of monomer 320 that will polymerize at a wavelength of collimated light beams provided by the light sources 300, and a patterning apparatus, such as a mask 330 with multiple apertures (open areas) 340. Each of the apertures 340 has a given shape and dimension substantially matching a cross-section geometry of a waveguide (e.g., waveguide 360a). Between the mask 330 and the monomer 320, there may be a substrate 350. Here, in FIG. 3, a truly 3D network can be formed because the intersecting polymer waveguides 360 will simply polymerize together, but will not interfere with waveguide propagation. Also, the spacing between the plurality of waveguides 360 corresponds with the pattern of the plurality of apertures 340. The pattern of the apertures 340 may, for example, be in a square pattern as shown in FIG. 4a and/or in a hexagonal pattern as shown in FIG. 4b. The hole (aperture) spacing, i.e., distance between apertures 340 in the mask 330, and the number of waveguides 360 formed from each of the apertures 340 will determine the open volume fraction (i.e. open space) of the formed three-dimensional ordered microstructure (or the formed open-cellular polymer micro-truss structure).

As such, through the system of FIG. 3, a three-dimensional ordered microstructure of an embodiment of the present invention can be designed for a given application. The design parameters include: 1) the angle and pattern of the polymer waveguides with respect to one another, 2) the packing, or relative density of the resulting cellular structure (or the open volume fraction), and 3) the cross-sectional shape and dimensions of the polymer waveguides. Here, in one embodiment, the waveguide (or truss) diameter can range from 10 microns to 5 mm depending on the design criteria. The length of the waveguide between waveguide nodes of interpenetrating waveguides can be between 5 and 15 times the diameter. In addition, the number of nodes, or the number of repeating unit cells, through the thickness can be designed. Typical microtruss structures can have ½ unit cell to 5 unit cells through the thickness. Moreover, due to the method of formation of the three-dimensional ordered microstructure (or the open-cellular polymer micro-truss structure) according to an embodiment of the present invention and as described in following method shown in FIG. 5, the propagation distances and/or the nodes of the interpenetrating waveguides are unperturbed by the change in index of refraction caused by polymerization.

Figure 5:
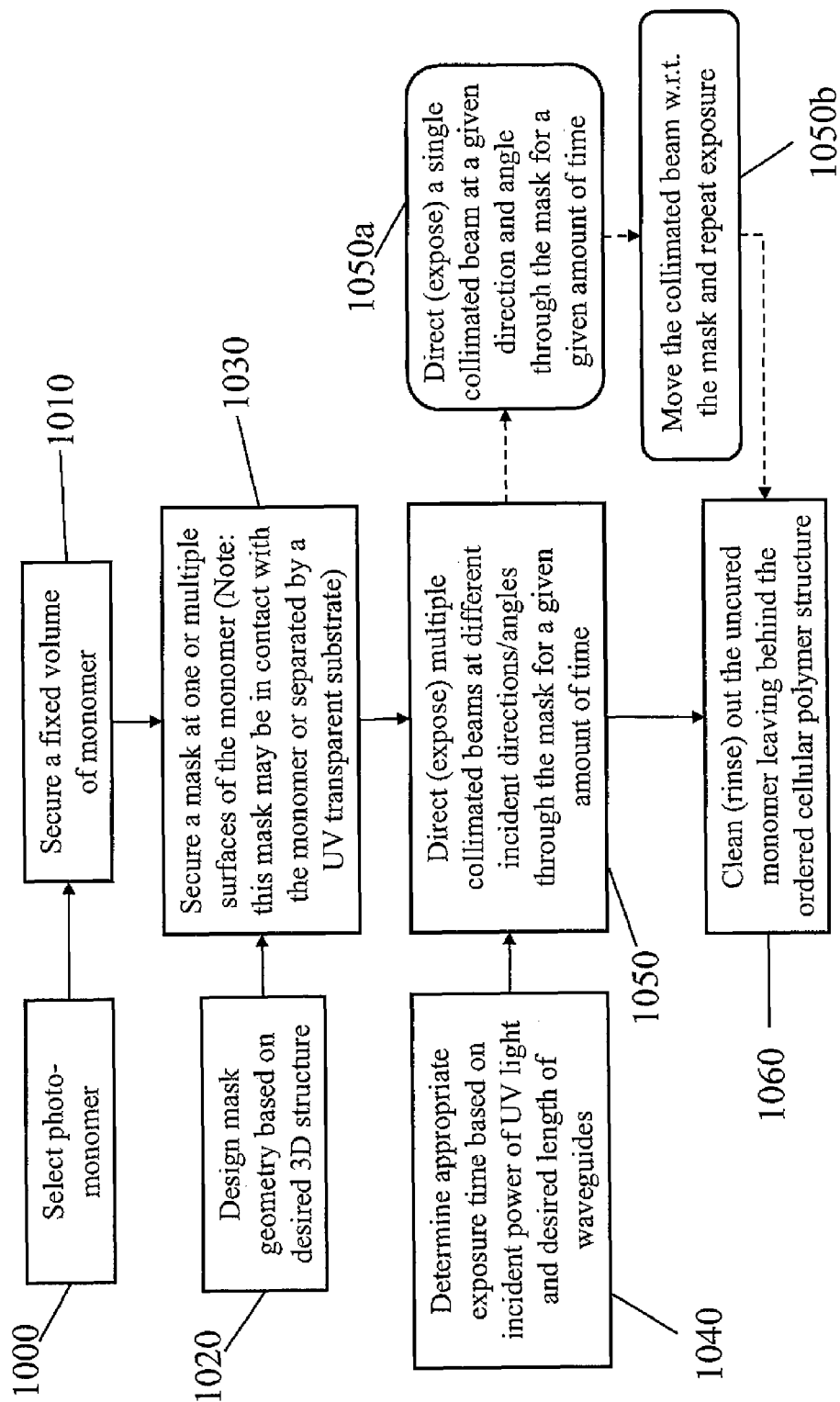
FIG. 5 is a process flow diagram for forming one or more polymer waveguides of a structure according to an embodiment of the present invention.

In more detail, FIG. 5 shows a method of forming a three-dimensional ordered microstructure (or an open-cellular polymer micro-truss structure) according to an embodiment of the present invention. As illustrated in FIG. 5, a photo-monomer is selected in block 1000. In block 1010, a volume of the selected photo-monomer is secured (e.g., in a reservoir). A mask geometry is designed based on a desired three-dimensional structure in block 1020. A patterning apparatus, such as a mask having the designed geometry, is secured in block 1030. Here, the secured mask has at least one aperture between at least one collimated light source and the volume of the selected photo-monomer. In addition, the mask may be in contact with the monomer or separated by a substrate (e.g., by a UV transparent substrate).

In block 1040, an appropriate exposure time is determined based on incident power of a collimated light beam from the at least one collimated light source (e.g., an incident power of a UV light) and a desired length of one or more waveguides. The collimated light beam from the at least one collimated light source is directed to the mask for a period of exposure time so that a portion of the collimated beam passes through the mask and is guided by the at least one aperture into the photo-monomer to form at least one waveguide through a portion of the volume of the photo-monomer. Here, the at least one waveguide has a cross-sectional geometry substantially matching the designed aperture geometry on the mask.

In one embodiment as shown in block 1050, multiple collimated beams at different incident directions and/or angles are directed through the mask for a given amount of time.

Alternatively, as shown in blocks 1050a, a single collimated beam at a given direction and angle is directed through the mask for a given amount of time. Then, at block 1050b, the collimated light beam is moved with respect to the mask and the exposure is repeated.

Then, at block 1060, any uncured photo-monomer is removed to leave behind a three-dimensional ordered polymer microstructure (or an open-cellular polymer micro-truss structure). Here, in one embodiment, the plurality of polymer waveguides are used to form the three-dimensional ordered polymer microstructure, and the three-dimensional ordered polymer microstructure corresponds with the pattern of the plurality of apertures.

The resulting three-dimensional polymer microstructure can be formed in seconds in the area where exposed to the incident collimated beam. Since the incident light and the monomer remain fixed with respect to one another during the formation of a polymer waveguide, the exposure area of the collimated beam(s) can be scanned over a larger surface area of monomer, leading to the formation of large-area structures.

As described, once the polymer cellular structure is formed in the volume of monomer, the remaining un-polymerized material (monomer) is removed leaving an open cellular polymer material that is the three-dimensional ordered microstructure (or the open-cellular polymer micro-truss structure). By way of example, a solvent that dissolves the monomer (but not the polymer) may be used to aid in the monomer removal.

With reference back to FIGS. 1 and 2, the truss elements 12, 14, 16 of the microstructure 10 define an open volume (i.e. free space) of the microstructure 10. In one embodiment, the microstructure 10 defines a free space of not less than about 40% by volume and not greater than about 99% by volume. In another embodiment, the microstructure 10 defines a free space of not less than about 70% by volume and not greater than about 95% by volume.

The truss elements 12, 14, 16 intersect at the nodes 18 to form symmetrical angles in three dimensions (three orthogonal directions). The symmetrical angles relative to the xz-plane (see, FIG. 1), can measure between 0° and 90°. That is, truss elements 12, 14, 16 interpenetrate each other to form "perfect" (i.e., unperturbed) nodes: each of the truss elements 12, 14, 16 defines an angle relative to a compression surface of the microstructure 10 (e.g. a surface extending along a direction of the xz-plane), and the respective angles defined by the truss elements 12, 14, 16 are substantially equal to one another. That is, in one embodiment, these nodes are unperturbed by changes in index of refraction caused by photopolymerization due to their formation as described with respect to FIG. 5. However, embodiments of the present invention are not limited thereto.

The truss elements 12, 14, 16 have an intrinsically high strength due to their small scale. In one embodiment, each of the truss elements 12, 14, 16 has an axial diameter of not greater than about 500 μm.

In another embodiment, each of the truss elements 12, 14, 16 has an axial diameter of not greater than about 200 μm. In another embodiment, each of the truss elements 12, 14, 16 has an axial diameter of not greater than about 1 μm. The truss elements 12, 14, 16 are configured to have a correspondingly small aspect ratio (e.g., length/diameter ratio) for withstanding a bending moment. Here, each of the truss elements 12, 14, 16 has a length not greater than 100 μm such that the truss elements can better withstand a mechanical load applied to the microstructure 10. As such, the truss elements 12, 14, 16 experience little, if any, bending deformation during application of the mechanical load to the microstructure 10.

At certain size scales (e.g., the size scales described above), the strength of the truss elements is increased, which corresponds to an increased strength of the microstructure 10. In one embodiment, each of the truss elements 12, 14, 16 has molecular alignment extending along an axial direction of the truss element. As such, an anisotropic material is produced, which provides a substantial degree of stiffness and/or strength along the axial direction. In one embodiment, in a material that is composed of long molecular chains (e.g., polymers), the molecules thereof can be aligned along a direction to provide an increased degree of mechanical strength and/or stiffness along the alignment direction. In more detail, where the molecular alignments of the truss elements 12, 14, 16 extend along the corresponding axial directions, the truss elements 12, 14, 16 are configured to axially transfer a mechanical load applied to the microstructure 10.

As described above, the microstructure 10 withstands the mechanical load, e.g., via axial tension and compression of the truss elements 12, 14, 16. Molecular alignment of the truss elements 12, 14, 16 along their respective axial directions lends additional strength and/or stiffness to the truss elements 12, 14, 16 and, accordingly, also to the microstructure 10.

In one embodiment, the truss elements 12, 14, 16 are configured to provide the microstructure 10 with a stretch-dominated behavior under a compression load applied to the microstructure 10. Such stretch-dominated behavior is contrasted from the bending-dominated behavior (e.g. of randomly oriented cellular structures), as described in Ashby, "The Properties Of Foam And Lattices," Philosophical Transactions—Royal Society Of London Series A Mathematical Physical And Engineering Sciences, Vol. 364, 2006, which is incorporated by reference herein in its entirety.

In a bending-dominated structure, the elastic modulus is proportional to the square of the relative density $\rho'/\rho_s'$, where $\rho'$ is the density of the cellular material and $\rho_s'$ is the density of the solid from which it is constructed. In contrast, a stretch-dominated structure (such as microstructure 10), has a compressive elastic modulus (E) directly proportional to both the relative density thereof and the modulus ($E_s$) of the solid material portion of the microstructure 10, as expressed in equation (1) below:

$$E_s = E_s(\sin^4 \theta)(\rho/\rho_s) \tag{1}$$

where $\rho$ is a density of the microstructure 10, $\rho_s$ is a density of a solid material portion of the microstructure 10, $\theta$ is an angle of at least one of the truss elements 12, 14, 16 relative to a compression surface of the microstructure 10, and $E_s$ is a modulus of the solid material portion of the microstructure 10. As such, the elastic modulus of a structure of embodiments of the present invention is also proportional to a geometric function of the angle $\theta$ of the structure, and $\theta$ can accordingly be chosen to vary (e.g., increase or reduce) the elastic modulus.

Figure 6:
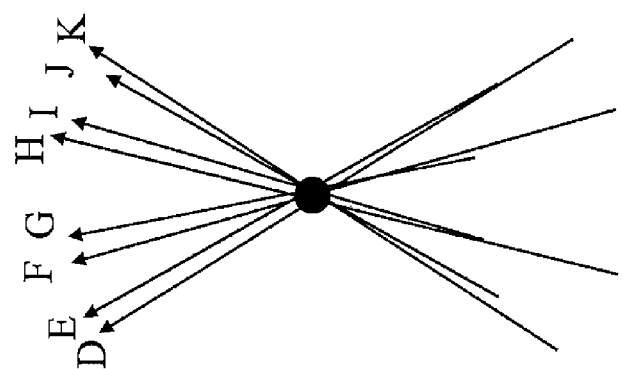
FIG. 6 is a perspective schematic view showing respective directions along which truss elements of a structure of an embodiment of the present invention extend.

With reference back to FIGS. 1 and 2, the microstructure 10 includes truss elements 12, 14, 16 respectively extending along A, B, and C directions. However, embodiments of the present invention are not limited thereto. For example, with reference to FIG. 6, a structure of an embodiment of the present invention may include truss elements defined by self-propagating polymer waveguides and extending along D, E, F, G, H, I, J and K directions, respectively. For example, a structure according to an embodiment of the present invention may include eight truss elements, each of which extends along a corresponding one of eight varying directions. Here, similar to the embodiment shown in FIGS. 1 and 2, the eight truss elements interpenetrate each to form nodes of a continuous material with a three-dimensional microstructure order. However, embodiments of the present invention are not limited thereto, and may include more or fewer than eight truss elements.

In a further embodiment of the present invention, an open volume of a cellular structure is filled at least partially with a material different from the material of the cellular structure itself, thereby creating an ordered bi-phase composite. Also in a further embodiment of the present invention, one or more truss elements of a cellular structure are coated with a material different from the material of the cellular structure itself to adjust the thermal behavior thereof. Also in a further embodiment of the present invention, base elements of a cellular structure are coated with a material different from the material of the cellular structure itself, and the base elements are removed to create a self-supporting structure having continuous but separated volumes.

The size scale and the features of structures of embodiments of the present invention can be utilized in heat transfer applications.

One embodiment of the present invention creates and/or utilizes a ceramic, carbon and/or ceramic/carbon composite, fabricated with a long range structural order, for use as brake or clutch components in automotive and aerospace applications. The original micro-truss (or three-dimensional ordered microstructure can be fabricated out of a polymeric material such as resin, as discussed above with respect to FIG. 5. While still in the polymer or resin form, the shape of the part can be easily machined or cut. Structures for gas, fluid or vapor transport can also be included directly at this stage. After forming the desired shape of the part from the polymer micro-truss (or the open-cellular polymer micro-truss structure), the polymer micro-truss itself can be converted to a metal or ceramic micro-truss, as discussed in U.S. patent application Ser. No. 12/008,479, filed on Jan. 11, 2008, entitled "Composite Structures With Ordered Three-Dimensional (3D) Continuous Interpenetrating Phases," the entire content of which is incorporated herein by reference.

In one embodiment of the present invention, a rotor is fabricated. Here, the first step in the rotor fabrication involves the creation of a disc shaped micro-truss in polymer form (or a disc shaped open-cellular polymer micro-truss structure).

Since the application will eventually be bound for a high performance application, it is likely that the rotor will be of the two piece design, that is, the section of the rotor that is compressed by the pad during braking (i.e. the rotor ring) is manufactured separately from the rotor "hat" which is the part of the rotor which bolts directly to the axle.

Figure 7:
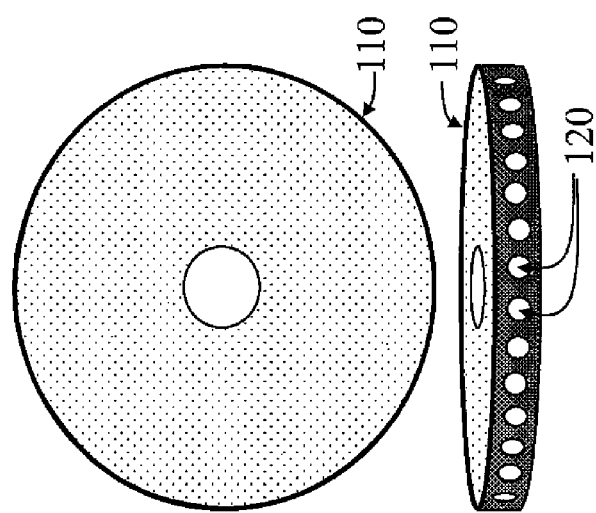
FIGS. 7 and 8 are schematics of rotor (and/or clutch) rings according to embodiments of the present invention.
Figure 8:
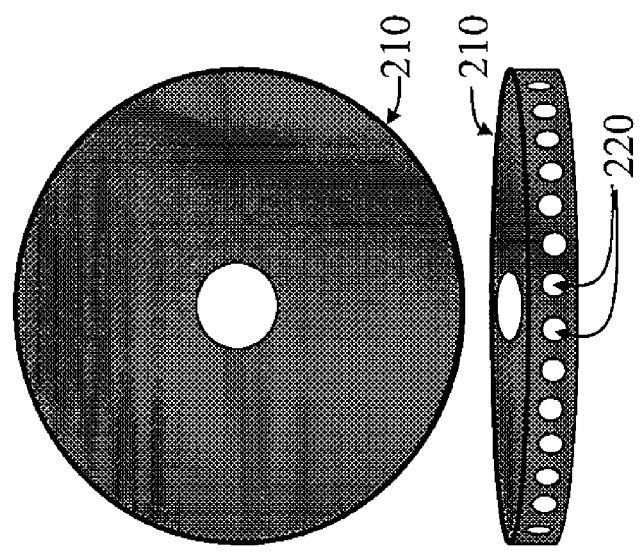

FIGS. 7 and 8 are schematics of rotor (and/or clutch) rings 100, 200 according to embodiments of the present invention. Referring to FIGS. 7 and 8, the rotor (and/or clutch) rings 100, 200 are each fabricated from a block of micro-truss polymer (or a block of open-cellular polymer micro-truss structure). The micro-truss polymer can be grown in any shape and machined to the shapes shown in FIGS. 7 and 8. Post growth processing allows for the rotor (and/or clutch) rings 100, 200 to be composed of any metal or ceramic material, as well as a metal ceramic composite. The embodiment in FIG. 7 shows that the rotor (and/or clutch) ring 100 has an outer facing surface that has been capped with a metal or ceramic face sheet or casing 110. The embodiment in FIG. 8 shows that the rotor (and/or clutch) ring 200 has (or is formed with) the pores 210 of the truss structure. These pores 210 are exposed on the surface of the rotor ring 200 and contact a corresponding pad of the rotor (and/or clutch). Here, in certain embodiments, holes 120, 220 are drilled perpendicular to the rotational axis of the rotor rings 100, 200 to help increase airflow into the truss and maximize heat exchange.

Figure 9:
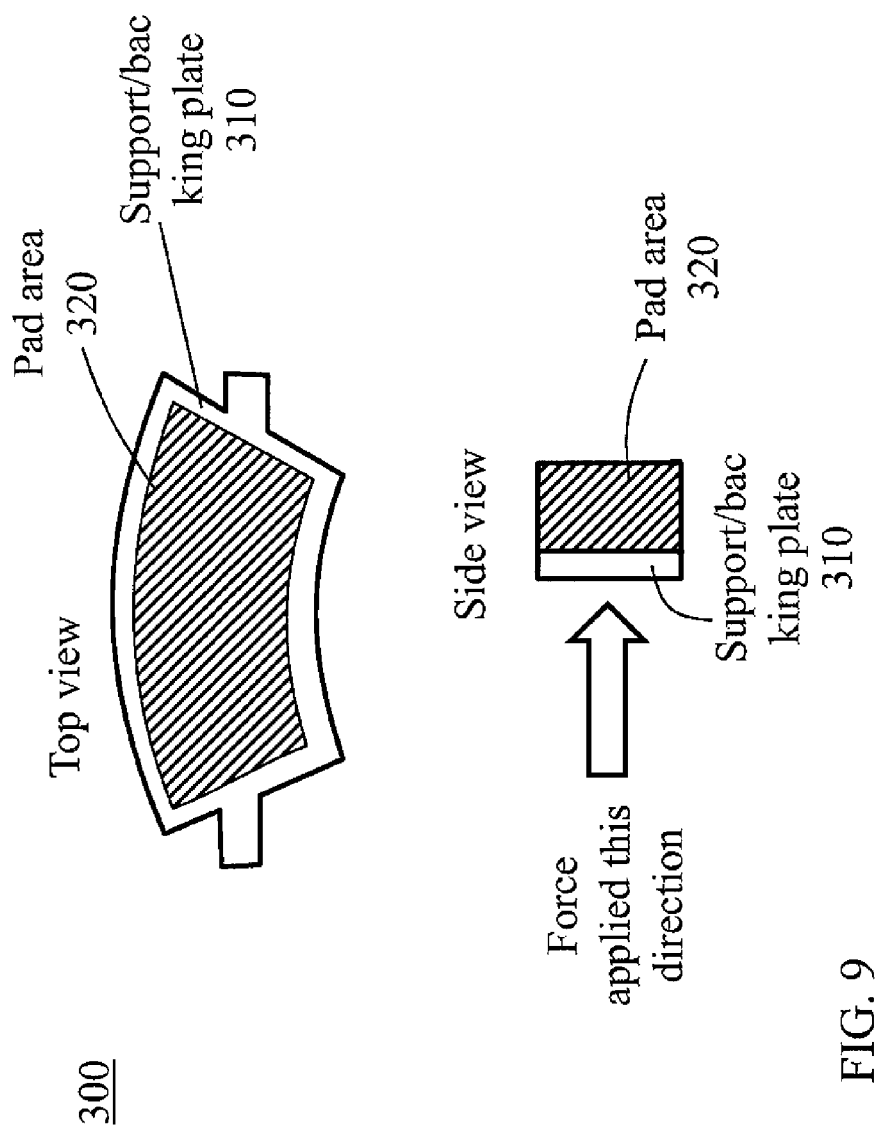
FIG. 9 is a schematic of a brake pad according to an embodiment of the present invention.

FIG. 9 is a schematic of a brake pad 300 according to an embodiment of the present invention. Referring to FIG. 9, the brake pad 300 is fabricated from a block of micro-truss polymer (or a block of open-cellular polymer micro-truss structure). The micro-truss polymer can be grown in any shape and machined to the shapes shown in FIG. 9. Post growth processing allows for the brake pad 300 to be composed of any metal or ceramic material, as well as a metal ceramic composite. The embodiment in FIG. 9 shows that the brake pad 300 has a support/backing plate 310. A pad area 320 is formed on the support/backing plate 310. As with the embodiments shown in FIGS. 7 and 8, the pad area 320 is formed with a plurality of pores of the truss structure. Here, the pad area 320 is on a first side of the support/backing plate 310 and configured to contact a corresponding braking surface of the brake (e.g., the rotor) when a force is applied on a second side of the support/backing plate 310 facing oppositely away from the first side and in direction perpendicular to the second side.

Fabrication

Figure 10A:
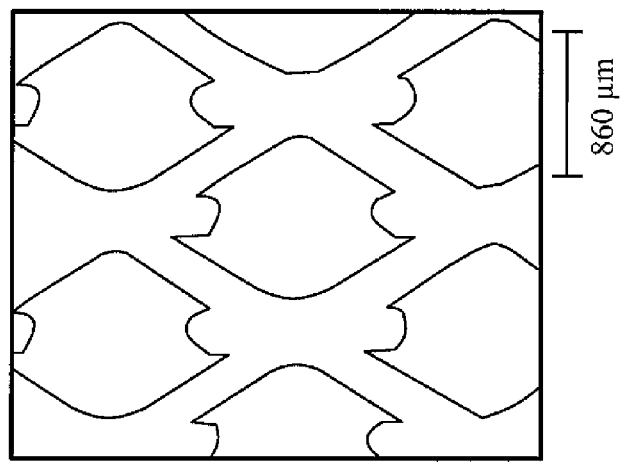
FIGS. 10a, 10b, and 10c schematically illustrate micrographs of micro-truss architectures created using self-forming optical fibers according to embodiments of the present invention.
Figure 10B:
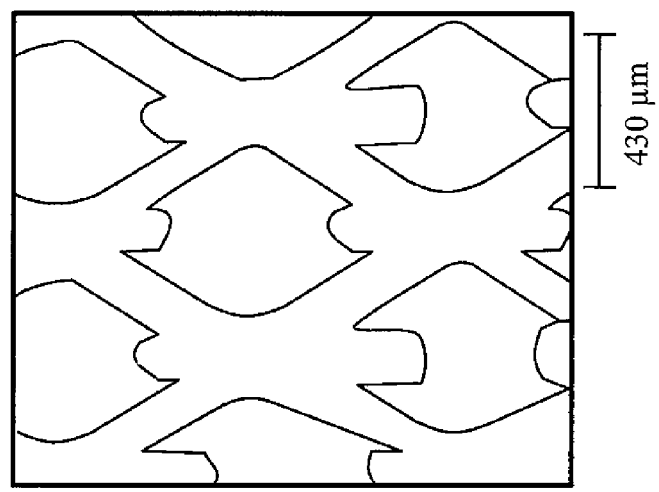
Figure 10C:
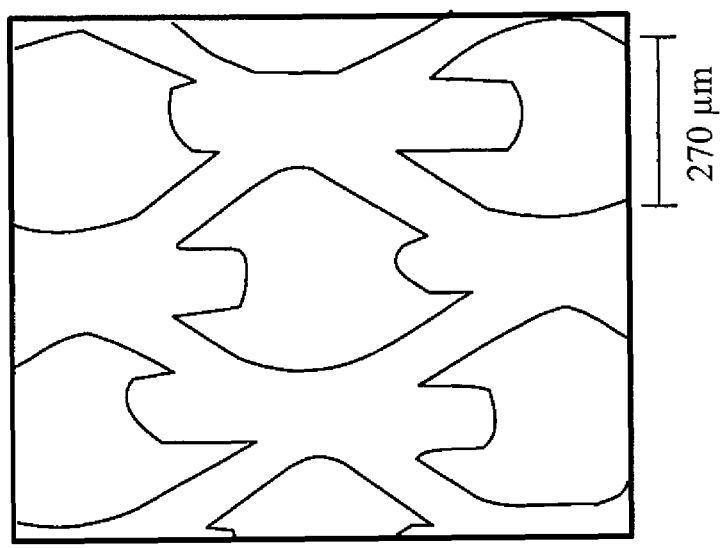

An embodiment of the present invention is directed to a method of forming a micro-truss based composite friction-and-wear apparatus. Here, the method provides a scalable lithography technique to fabricate highly-ordered three-dimensional cellular materials with a micro-truss architecture. The open-cellular polymer micro-truss structures can be converted to various other suitable materials or structures, such as metals or ceramics, utilizing suitable processes while still maintaining the originally designed polymer structure. In one embodiment, the method is based on the three-dimensional patterning of self-forming, self-propagating polymer waveguides, or fibers. However, unlike any existing lithography process, these high aspect ratio polymer fibers, which maintain an approximate constant cross-section over their entire length, can be "grown" from a single point exposure of light in a suitable photo-monomer without the effects of light diffraction. The polymer fibers are the building blocks of the ordered three-dimensional open cellular materials. By simultaneously (or currently) forming an interconnected array of these fibers in three-dimensions and removing the uncured monomer, the method according to an embodiment of the present invention can rapidly form unique three-dimensional microstructures as shown in FIGS. 10*a*, 10*b*, and 10*c*. That is, FIGS. 10*a*, 10*b*, and 10*c* schematically illustrate micrographs of micro-truss architectures created using self-forming optical fibers according to embodiments of the present invention. Because the process itself affords great flexibility and control of the fiber angle, diameter, and spatial location, the microstructure can be specifically designed to closely match theoretically determined ideal wicking architectures.

According to embodiments of the present invention, ordered three-dimensional polymer micro-truss structures can be made to have a dimension that are over an area of 2 cm×2 cm from a single exposure (lasting <1 min) on a single two-dimensional mask utilizing multiple collimated beams. However, the present invention is not thereby limited. Also, the structures according to embodiments of the present invention can have a thickness ranging from about 3 to about 10 mm (or from 3 to 10 mm), with a range of repeating unit cell feature sizes as, for example, shown in FIGS. 10*a*, 10*b*, and 10*c*. The minimum thickness is dependent only on sufficient interconnection between the truss members to enable the microstructure to be self-supporting and can be reduced to <1 mm as the feature sizes decrease.

The micro-truss structures shown in FIGS. 10*a*, 10*b*, and 10*c* were fabricated utilizing collimated UV light from a mercury arc lamp. However, the present invention is not thereby limited. For example, thinner polymer truss members (<10 μm) can be formed using higher intensity light, such as from a pulsed excimer laser.

One potential benefit of starting with a polymer micro-truss material and converting it to a suitable wicking material is net shape manufacturing. Prior to any material conversion, the polymer itself is flexible and can conform to different surfaces. This shape can be "locked-in" with a post-cure heat treatment, and subsequent material coating, etc. can be done on the shaped structure.

Figure 11:
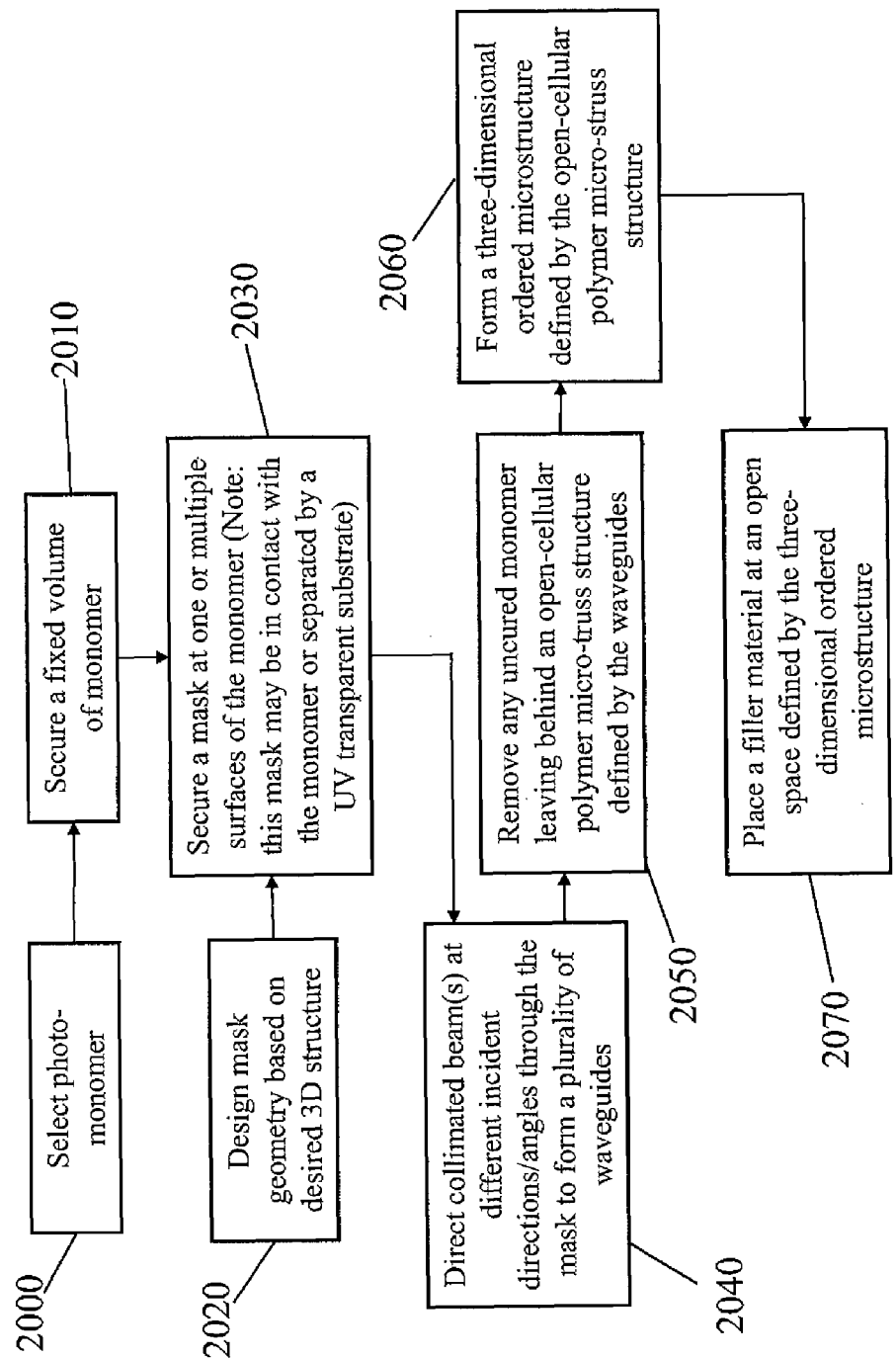
FIG. 11 is a process flow diagram for showing a method of forming a micro-truss based composite friction-and-wear apparatus according to an embodiment of the present invention.

FIG. 11 shows a method of forming a micro-truss based composite friction-and-wear apparatus according to an embodiment of the present invention. As illustrated in FIG. 11 a photo-monomer is selected in block 2000. In block 2010, a volume of the selected photo-monomer is secured (e.g., in a reservoir). A mask geometry is designed based on a desired 3D structure in block 2020. A patterning apparatus, such as a mask having the designed geometry, is secured in block 2030. Here, the secured mask has at least one aperture between at least one collimated light source and the volume of the selected photo-monomer. In addition, the mask may be in contact with the monomer or separated by a substrate (e.g., by a UV transparent substrate).

In block 2040, an appropriate exposure time is determined based on incident power of a collimated light beam from the at least one collimated light source (e.g., an incident power of an UV light) and a desired length of one or more waveguides. The collimated light beams from the at least one collimated light source are directed to the mask for a period of exposure time so that portions of the collimated beams pass through the mask and are guided by the at least one aperture into the photo-monomer to form a plurality of waveguides through a portion of the volume of the photo-monomer. Here, the waveguides have a cross-sectional geometry substantially matching the designed aperture geometry on the mask.

At block 2050, any uncured photo-monomer is removed to leave behind a 3D ordered polymer microstructure. Here, in one embodiment, the plurality of polymer waveguides are used to form the 3D ordered polymer microstructure, and the 3D ordered polymer microstructure corresponds with the pattern of the plurality of apertures.

In block 2060, a 3D ordered microstructure defined by the 3D ordered polymer microstructure (open-cellular polymer micro-truss structure) is formed. Here, a ceramic 3D microstructure may be formed by converting the 3D ordered polymer microstructure (open-cellular polymer micro-truss structure) to the ceramic 3D microstructure. Alternatively, a carbon 3D microstructure may be formed by converting the 3D ordered polymer microstructure (open-cellular polymer micro-truss structure) to the carbon 3D microstructure. In addition, the 3D ordered microstructure may be formed into a shape of a clutch, a brake rotor, or a brake pad.

Then, at block 2070, a filler material is placed at an open space of the 3D ordered microstructure. Here, the filler material may be a carbon filler material or a metallic filler material.

In one embodiment, the method may further include capping a casing on a surface of the three-dimensional ordered microstructure with the filler material, wherein the casing comprises a material selected from the group consisting of a ceramic based casing material, a metallic based casing material, a carbon based casing material, and combinations thereof.

Wicking of Thermal Transport Fluid

In cases where high efficiency thermal transport between the hotter friction surface and the cooler non-friction surface portions are desired, internal parts of the structure or a nearby heat sink (such as a high surface area structure exposed to external airflow, heat pipe like structure, etc.) may be included in the rotor or brake pad structure. High efficiency wicking can be accomplished either by enabling liquid to wick along the truss member surfaces or between neighboring truss members that are spaced closely together accomplishes the wicking function of the micro-truss array. The former wicking mode is accomplished variously by (a) coating a structural micro-truss with an appropriate thin porous medium—described in more detail below (b) architecting the surfaces of the truss members with fluid-wicking grooves or (c) co-locating multiple parallel truss members such that fluid will wick along the direction of the parallel truss members. The latter wicking mode is enabled when non-parallel truss members are spaced closely so as to encourage fluid wicking through the array.

In one embodiment, the thin porous medium coated onto the micro-truss array as discussed above can be an open cell carbon foam, sintered copper, a porous ceramic and/or open cell poly urethane foam. In one embodiment, the open cell carbon foam is preferred. Here, in one embodiment, the coating material must be capable of wicking the working fluid of the device, have a porosity greater than 20%, and/or can adhere to the micro-truss. The micro-truss may be a polymer truss or metallic truss. In one embodiment, the micro-truss is preferably formed of aluminum.

Figure 12:
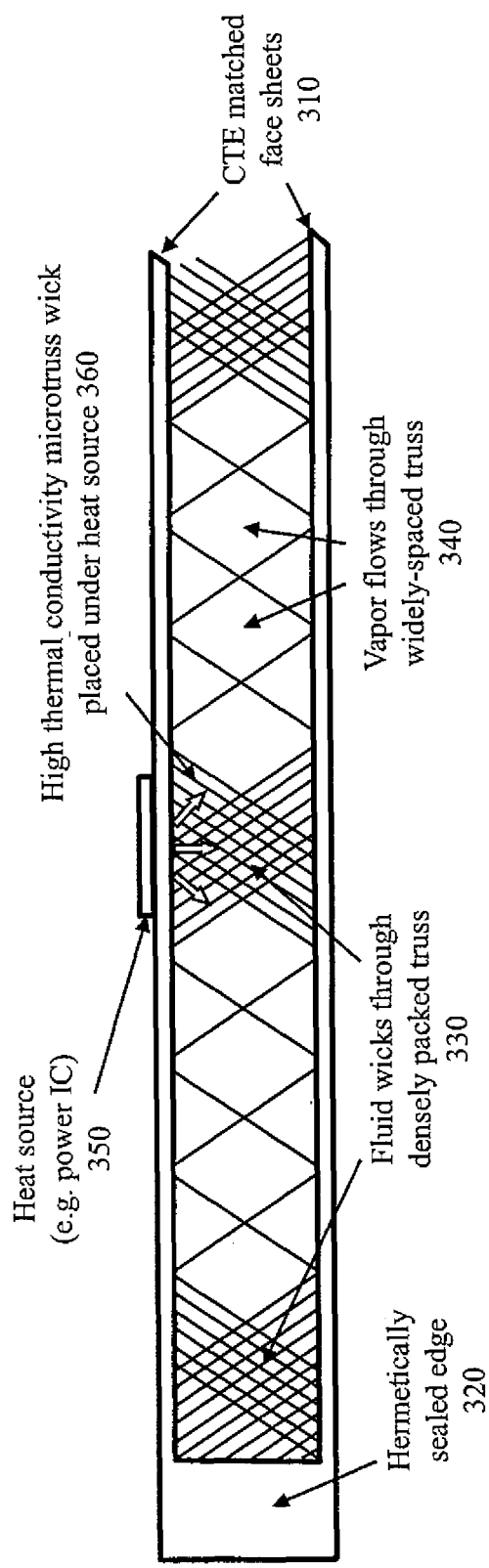
FIG. 12 illustrates a wicked heat pipe mode tailored design for a heat source/sink.

In more detail, FIG. 12 shows a wicked heat pipe mode tailored design for a heat source/sink. Here, the design in FIG. 12 includes coefficient of thermal expansion (CTE) matched face sheets 310 that are hermetically sealed at the edges 320. Also, as illustrated in FIG. 12, one or more densely packed truss portions 330 and one or more widely-spaced truss portions 340 are interposed between the CTE matched face sheets. In addition, a heat source (e.g., power IC) 350 is placed on a side of one of the face sheets 310 facing away from the truss ports 330, 340.

As such, in the design shown in FIG. 12, vapor (or cooling vapor) can flow through the widely-spaced truss portions 340, and can also wick through the densely packed truss portions 330. In addition, one of the densely packed truss portions 330 that is placed under the heat source 350 can be utilized or function as a high thermal conductivity micro-truss wick 360 as shown in FIG. 12.

Figure 13:
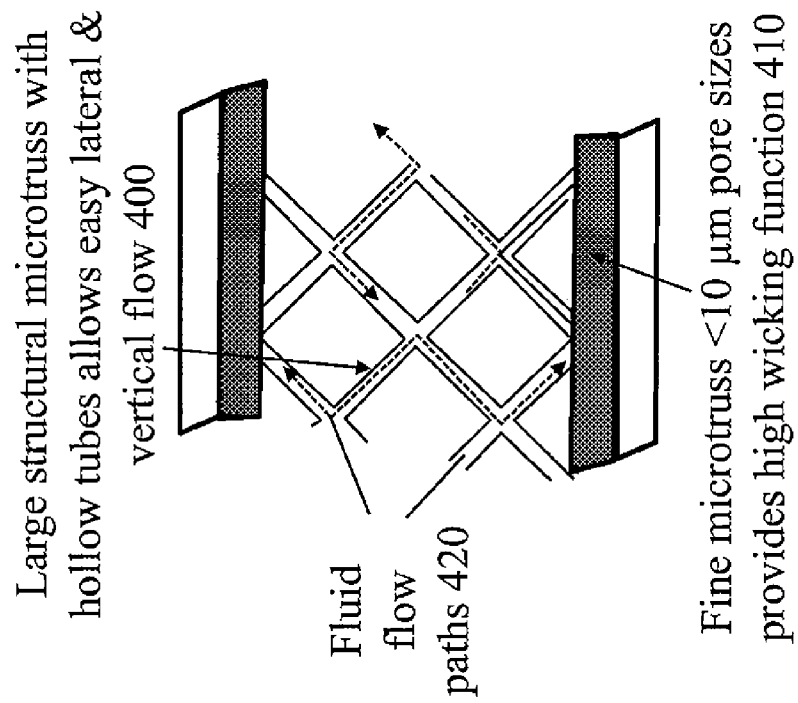
FIG. 13 illustrates composite wick geometry for high-g wicking according to an embodiment of the present invention.

FIG. 13 shows composite wick geometry for high-g wicking according to an embodiment of the present invention. Here, the geometry of FIG. 13 is shown to include a large structural micro-truss core 400 interposed between two fine micro-truss layers 410. In addition, the two fine micro-truss layers 410 are in turn interposed between two CTE matched face sheets.

In the geometry shown in FIG. 13, the large structural micro-truss core 400 is formed to have a plurality of hollow tubes to allow each lateral and vertical flow of fluid (e.g., coolant) through the fluid flow paths 420 defined by the hollow tubes. Also, in one embodiment, the truss members (or trusses) of each of the two fine micro-truss layers 410 are formed to have <10 µm pore sizes to provide for high wicking function.

Figure 14:
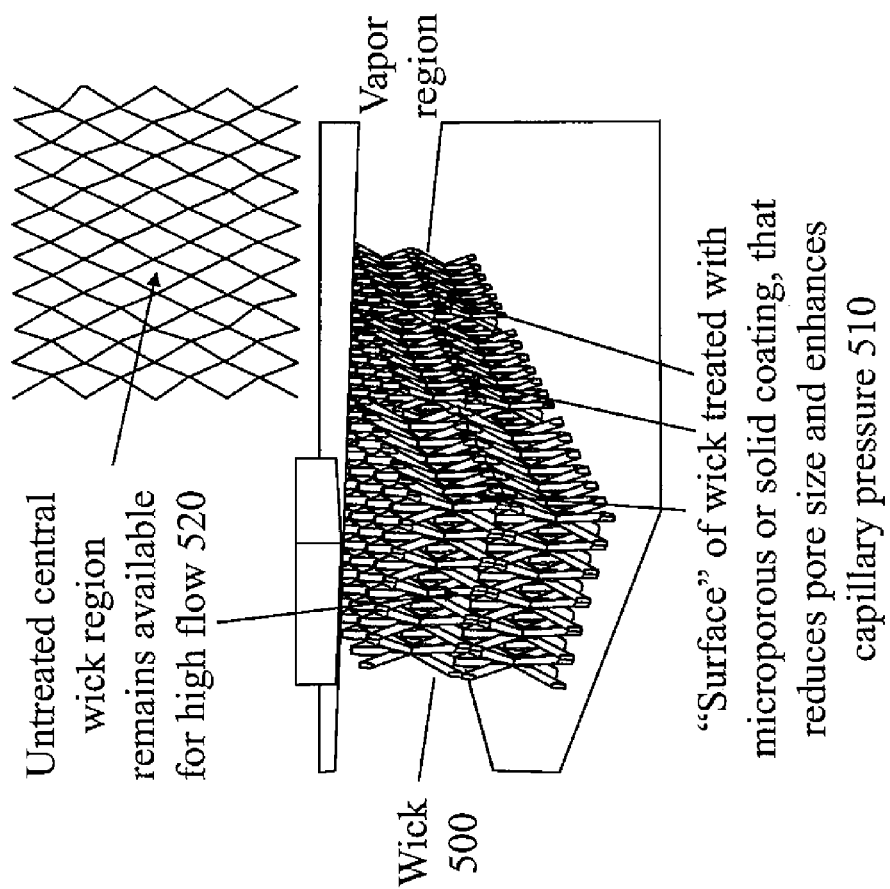
FIG. 14 illustrates composite wick geometry for high-g wicking according to another embodiment of the present invention.

FIG. 14 shows composite wick geometry for high-g wicking according to another embodiment of the present invention. Here, the geometry of FIG. 14 is shown to include a wick 500 interposed between two CTE matched face sheets. The wick 500 includes an untreated central wick region 520 and a surface of wick treated with microporous or solid coating 510.

In the geometry shown in FIG. 14, the untreated central wick region 520 remains untreated to provide for high fluid flow, while the surface of wick treated with microporous or solid coating 510 is treated to reduce pore size and enhance capillary pressure.

In view of the foregoing, embodiments of the present invention provide a micro-truss based composite friction-and-wear apparatus with a three-dimensional ordered microstructure and a method creating the same. In one embodiment, the micro-truss based composite friction-and-wear apparatus is a micro-truss based composite clutch, brake rotor, and/or pad.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A micro-truss based composite friction-and-wear apparatus that is a clutch, a brake rotor, or a brake pad, the apparatus comprising:
   a filler material; and
   a three-dimensional ordered microstructure comprising:
   a plurality of first truss elements defined by a plurality of first self-propagating polymer waveguides and extending along a first direction;
   a plurality of second truss elements defined by a plurality of second self-propagating polymer waveguides and extending along a second direction; and
   a plurality of third truss elements defined by a plurality of third self-propagating polymer waveguides and extending along a third direction;
   wherein the first, second, and third ordered truss elements are coupled at a plurality of nodes unperturbed by changes in index of refraction caused by photopolymerization of the first, second and third self-propagating polymer waveguides and defined by waveguide intersections of the first, second and third self-propagating polymer waveguides;

wherein the first, second, and third truss elements interpenetrate each other at the plurality of nodes to form a continuous material;

wherein the first, second, and third truss elements define an open space; wherein the filler material occupies at least a portion of the open space; wherein the three-dimensional ordered microstructure is self-supporting.

2. The apparatus of claim 1, wherein the filler material is a carbon filler material.

3. The apparatus of claim 1, wherein the filler material is a metallic filler material.

4. The apparatus of claim 1, wherein the filler material comprises a carbon filler material and a metallic filler material.

5. The apparatus of claim 1, wherein the three-dimensional ordered microstructure is a ceramic three-dimensional microstructure converted from an open-cellular polymer micro-truss structure.

6. The apparatus of claim 1, wherein the three-dimensional ordered microstructure is a carbon three-dimensional microstructure converted from an open-cellular polymer micro-truss structure.

7. The apparatus of claim 1, wherein the three-dimensional ordered microstructure comprises a ceramic material and a carbon material.

8. The apparatus of claim 1, further comprising a casing for capping a surface of the three-dimensional ordered microstructure with the filler material.

9. The apparatus of claim 8, wherein the casing comprises a material selected from the group consisting of a ceramic based casing material, a metallic based casing material, a carbon based casing material, and combinations thereof.

10. A micro-truss based composite friction-and-wear apparatus that is a heat pipe for transferring heat and supporting a filler material comprising:
    the filler material; and
    a three-dimensional ordered microstructure comprising:
        a plurality of first truss elements defined by a plurality of first self-propagating polymer waveguides and extending along a first direction;
        a plurality of second truss elements defined by a plurality of second self-propagating polymer waveguides and extending along a second direction; and
        a plurality of third truss elements defined by a plurality of third self-propagating polymer waveguides and extending along a third direction;
        wherein the first, second, and third ordered truss elements are coupled at a plurality of nodes unperturbed by changes in index of refraction caused by photopolymerization of the first, second and third self-propagating polymer waveguides and defined by waveguide intersections of the first, second and third self-propagating polymer waveguides;
        wherein the first, second, and third truss elements interpenetrate each other at the plurality of nodes to form a continuous material;
        wherein the first, second, and third truss elements define an open space; wherein the filler material occupies at least a portion of the open space; wherein the three-dimensional ordered microstructure is self-supporting.

11. The apparatus of claim 1, further comprises a porous wicking medium coated onto a surface of at least one truss element of the first truss elements, the second truss elements, or the third truss elements.

12. The apparatus of claim 1, wherein at least one truss element of the first truss elements, the second truss elements, or the third truss elements has a plurality of fluid-wicking grooves.

13. The apparatus of claim 1, wherein an array of truss elements of the first truss elements, the second truss elements, or the third truss elements are configured with each other to allow for fluid wicking through the array.

14. The apparatus of claim 1, wherein at least another portion of the open space defined by the first, second, and third truss elements is configured to out gas hot air in a direction parallel or perpendicular to a rotational axis of the apparatus.

15. A method of forming a micro-truss based composite friction-and-wear apparatus that is a clutch, a brake rotor, or a brake pad, the method comprising:
    securing a volume of a photo-monomer;
    securing a mask between at least one collimated light source and the volume of the photo-monomer, the mask having a plurality of apertures;
    directing a collimated light beam from the at least one collimated light source to the mask for a period of exposure time such that a portion of the collimated light beam passes through the mask and is guided by the plurality of apertures into the photo-monomer to form a plurality of waveguides through a portion of the volume of the photo-monomer;
    removing any uncured photo-monomer to leave behind an open-cellular polymer micro-truss structure having a plurality of truss elements defined by the plurality of waveguides;
    forming a three-dimensional ordered microstructure defined by the open-cellular polymer micro-truss structure;
    placing a filler material at an open space of the three-dimensional ordered microstructure.

16. The method of claim 15, wherein placing of the filler material comprises placing at least one of a carbon filler material or a metallic filler material at the open space of the three-dimensional order microstructure.

17. The method of claim 15, wherein the forming of the three-dimensional ordered microstructure comprises converting the open-cellular polymer micro-truss structure to a ceramic three-dimensional microstructure.

18. The method of claim 15, wherein the forming of the three-dimensional ordered microstructure comprises converting the open-cellular polymer micro-truss structure to a carbon three-dimensional microstructure.

19. The method of claim 15, further comprising:
    capping a casing on a surface of the three-dimensional ordered microstructure with the filler material, wherein the casing comprises a material selected from the group consisting of a ceramic based casing material, a metallic based casing material, a carbon based casing material, and combinations thereof.

20. A micro-truss based composite friction-and-wear apparatus that is a clutch, a brake rotor, or a brake pad comprising:
    a filler material;
    and a three-dimensional ordered microstructure comprising:
        a plurality of first truss elements defined by a plurality of first self-propagating polymer waveguides and extending along a first direction;
        a plurality of second truss elements defined by a plurality of second self-propagating polymer waveguides and extending along a second direction; and a plurality of third truss elements defined by a plurality of third self-propagating polymer waveguides and extending along a third direction;

wherein the first, second, and third ordered truss elements are coupled at a plurality of nodes unperturbed by changes in index of refraction caused by photopolymerization of the first, second and third self-propagating polymer waveguides and defined by waveguide intersections of the first, second and third self-propagating polymer waveguides;

wherein the first, second, and third truss elements interpenetrate each other at the plurality of nodes to form a continuous material;

wherein the first, second, and third truss elements define an open space; wherein the filler material occupies at least a portion of the open space;

wherein the three-dimensional ordered microstructure is self-supporting; and wherein the filler material comprises a carbon filler material or a metallic filler material.

* * * * *